Feb. 13, 1968  B. SCHUBERT  3,368,460
METHOD AND APPARATUS FOR THE PRODUCTION OF MOUTHPIECES
Filed Nov. 4, 1964  10 Sheets-Sheet 1

Inventor:
BERNHARD SCHUBERT
BY Michael J. Striker
his ATTORNEY

Inventor:
BERNHARD SCHUBERT
BY Michael J. Striker
his ATTORNEY

Feb. 13, 1968  B. SCHUBERT  3,368,460
METHOD AND APPARATUS FOR THE PRODUCTION OF MOUTHPIECES
Filed Nov. 4, 1964  10 Sheets-Sheet 4

Inventor:
BERNHARD SCHUBERT

BY Richard J. Striker
his ATTORNEY

Feb. 13, 1968  B. SCHUBERT  3,368,460
METHOD AND APPARATUS FOR THE PRODUCTION OF MOUTHPIECES
Filed Nov. 4, 1964  10 Sheets-Sheet 5

Inventor:
BERNHARD SCHUBERT
BY Michael J. Striker
his ATTORNEY

Feb. 13, 1968   B. SCHUBERT   3,368,460
METHOD AND APPARATUS FOR THE PRODUCTION OF MOUTHPIECES
Filed Nov. 4, 1964   10 Sheets-Sheet 6
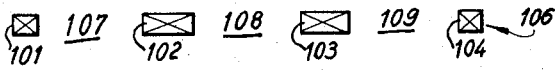
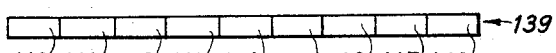
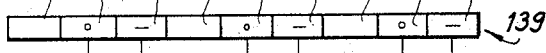
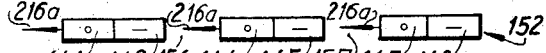
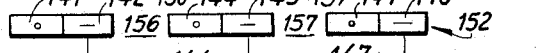
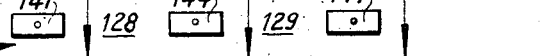
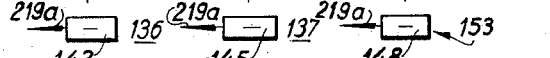
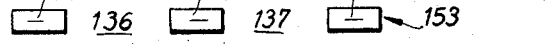
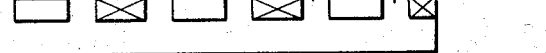
Inventor:
BERNHARD SCHUBERT
BY Richard J. Striker
his ATTORNEY Feb. 13, 1968     B. SCHUBERT     3,368,460
METHOD AND APPARATUS FOR THE PRODUCTION OF MOUTHPIECES
Filed Nov. 4, 1964     10 Sheets-Sheet 8

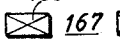
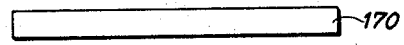
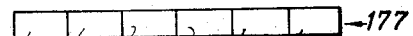
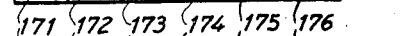
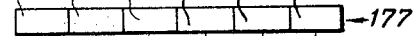
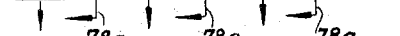
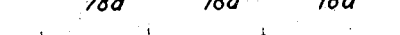
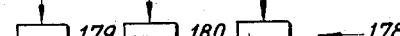
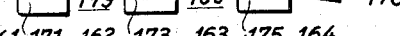
Inventor:
BERNHARD SCHUBERT
BY Michael J. Striker
his ATTORNEY Feb. 13, 1968   B. SCHUBERT   3,368,460
METHOD AND APPARATUS FOR THE PRODUCTION OF MOUTHPIECES
Filed Nov. 4, 1964   10 Sheets-Sheet 9

*Inventor:*
BERNHARD SCHUBERT

BY Michael J. Striker
his ATTORNEY

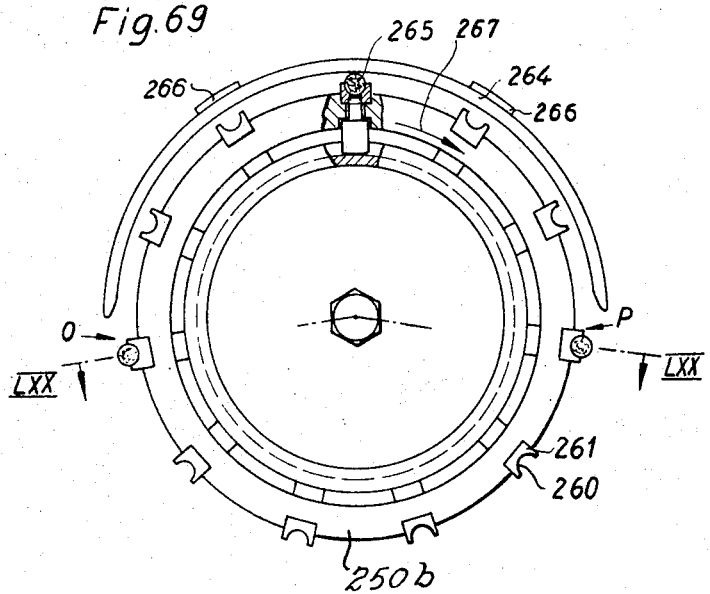
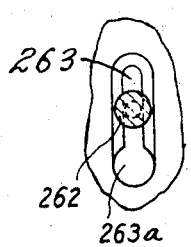
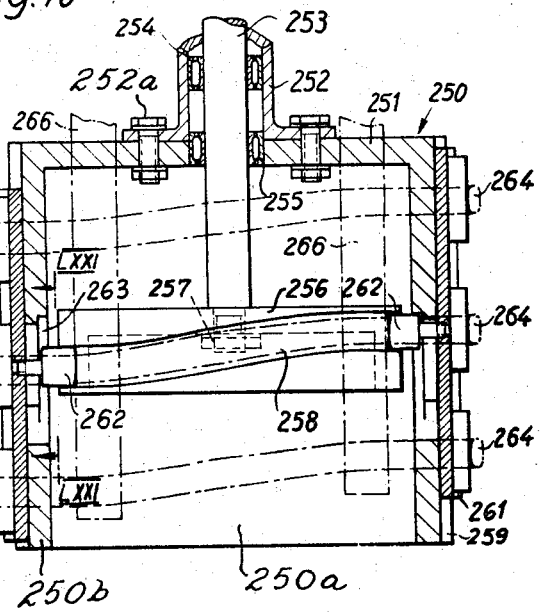

_United States Patent Office_

3,368,460
Patented Feb. 13, 1968

3,368,460
METHOD AND APPARATUS FOR THE PRODUCTION OF MOUTHPIECES
Bernhard Schubert, Hamburg-Lohbrugge, Germany, assignor to Hauni-Werke Körber & Co. K.G., Hamburg-Bergedorf, Germany
Filed Nov. 4, 1964, Ser. No. 408,998
Claims priority, application Great Britain, Nov. 11, 1963, 44,338/63
32 Claims. (Cl. 93—1)

ABSTRACT OF THE DISCLOSURE

Composite mouthpieces are produced by subdividing each of a series of first filter rods into a first group of $n+1$ coaxial rod-shaped members, shifting the members of each group axially to separate such members by $n$ gaps, subdividing each of a series of second filter rods into second groups of $m \cdot n$ rod-shaped members, breaking up each second group into $m$ subgroups by moving the members of subgroups transversely with reference to each other, shifting $m-1$ subgroups axially into transverse alignment with the remaining subgroup and with the gaps between the members of first groups, shuffling each subgroup with a first group to form assemblies wherein members of a first group alternate with members of a subgroup, and convoluting adhesive-coated wrappers around such assemblies.

---

The present invention relates to the production of mouthpieces for filter cigarettes or the like. More particularly, the invention relates to a method and apparatus for the production of composite mouthpieces and of smokers' products which embody such mouthpieces. Thus, the ultimate product invariably consists of or comprises a composite mouthpiece which includes at least two rod-shaped filters of unit length.

In accordance with presently prevailing practice, composite mouthpieces for filter cigarettes, cigars, cigarillos or the like are produced by subdividing a filter rod of a first type into sections of equal length, by thereupon moving the sections axially and away from each other to form therebetween gaps of predetermined axial length, by subdividing a filter rod of a second type into sections of a length which at most equals the length of a gap between the sections of the first type, by thereupon moving the sections of the second type axially and away from each other to form therebetween gaps of a length at least equal to the length of a section of the first type, by thereupon shuffling the two groups of sections to form an assembly of coaxial sections wherein sections of the first type alternate with sections of the second type, and by finally wrapping the assembly into a length of adhesive-coated wrapper material to form a composite mouthpiece of multiple unit length which may be subdivided into shorter mouthpieces of double unit length or unit length.

In order to move the sections which are obtained by subdivision of a filter rod away from each other, the apparatus for making composite mouthpieces in accordance with the just outlined conventional method normally comprise wedges, friction generating rollers or similar spreading or shifting devices which come in actual contact with the end faces of sections and are likely to deform or to otherwise damage the material, especially if the material of the sections is easy to deform.

Accordingly, it is an important object of the present invention to provide a novel method of producing composite mouthpieces in such a way that at least some sections of one group of sections which are shuffled with each other to form an assembly of coaxial rod-shaped members need not be shifted axially so that such sections need not undergo any, even the slightest, deformation prior to or during shuffling.

Another object of the invention is to provide a method of mass-producing composite mouthpieces in a continuous operation, within a small area, and with utmost accuracy so that the number of rejects will be negligible.

Another object of the invention is to provide a novel apparatus which may be utilized to practice the above outlined method and which can produce composite mouthpieces or filter-tipped rod-shaped smokers' articles in a fully automatic way.

A further object of the invention is to provide a novel method of manipulating groups of sections which are obtained by subdividing filter rods of multiple unit length.

Still another object of my invention is to provide a novel method of shuffling the thus manipulated sections with sections consisting of another filter material.

An additional object of my invention is to provide an apparatus for the production of duplex or triplex mouthpieces converted for the production of different types of mouthpieces.

Another object of the invention is to provide an apparatus for the production of composite mouthpieces which may consist of two or more different filter materials and wherein one of such materials may be a granular, pulverulent or other comminuted substance.

A further object of the invention is to provide a method according to which the mouthpieces may be produced in such a way that the adjoining rod-shaped members which consist of different materials may be separated by narrower or wider clearances whereby such clearances either serve to lengthen the mouthpiece or to accommodate a further filter material, for example, a measured quantity of activated charcoal or another granular substance.

Briefly stated, one feature of my invention resides in the provision of a novel method of producing composite mouthpieces for cigarettes or the like. The method comprises the steps of subdividing each of a series of parallel equidistant filter rods consisting of a first filter material into a group of coaxial rod-shaped members including two end filters of unit length and at least one intermediate section of double unit length, shifting the members of each group axially and away from each other so that the adjoining members are separated by gaps of at least double unit length, subdividing each of a series of parallel equidistant filter rods consisting of a second filter material into a second group of rod-shaped members of double unit length wherein the number of such members is a whole multiple of the number of gaps between the members of a first group, breaking up each second group into a plurality of subgroups wherein each subgroup contains the same number of axially spaced members as the number of gaps between the members of a first group by moving the members of such subgroups transversely and in different directions with reference to each other, shifting at least some of the thus obtained subgroups axially to move each member of any given subgroup in transverse alignment with a member of each other subgroup and with a gap between the members of the first groups, shuffling or interdigitating each subgroup with one of the first groups by introducing each member of any given subgroup into one of the gaps between the members of the corresponding first group to form assemblies of coaxial rod-shaped members wherein members of first filter material alternate with members of second filter material and wherein the filters are located at the ends, and convoluting an adhesive-coated wrapper sheet around each of the assemblies to form composite mouthpieces of multiple unit length.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIGS. 29 to 42 illustrate the steps of a method which may be carried out by resorting to the apparatus of FIG. 28;

FIGS. 44 to 58 illustrate the steps of a method which may be carried out with the apparatus shown in FIG. 43;

FIG. 69 is an end elevational view of a shifting conveyor which may be utilized in the apparatus of my invention to simultaneously change the axial position of a group or subgroup of coaxial rod-shaped members while the distance between such members remains unchanged;

FIG. 70 is a substantially axial section through the shifting conveyor as seen in the direction of arrows from the line LXX—LXX of FIG. 69; and FIG. 71 is a fragmentary front elevational view of a detail as seen in the direction of the arrow LXXI in FIG. 70.

Figure 2:
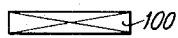
FIGS. 2 to 13 illustrate the steps of a method which may be carried out by resorting to the apparatus of FIG. 1, the same steps being shown on a smaller scale in FIG. 1 and being provided with lead lines to indicate such portions of the apparatus where the corresponding steps are performed.

Referring first to FIGS. 2 to 13, there are illustrated the steps of producing a composite (duplex) mouthpiece of multiple unit length in acordance with a first embodiment of my method. FIG. 2 illustrates a filter rod 100 of sextuple unit length which consists of a first filter material (hereinafter called white filter rod) and which is thereupon subdivided into a group 105 of four coaxial rod-shaped members (see FIG. 3) including two end filters 101, 104 of unit length and two intermediate sections 102, 103 of double unit length. The rod-shaped members 101–104 of this group 105 are then shifted axially and away from each other to form a group 106, shown in FIG. 4, wherein the adjoining members are separated from each other by gaps 107, 108, 109 of at least double unit length. The unit lengths referred to in connection with the gaps 107–109 may but need not be the same as the unit length of the rod-shaped member 101 or 104.

Figure 5:
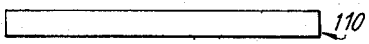
Figure 6:
Figure 7:
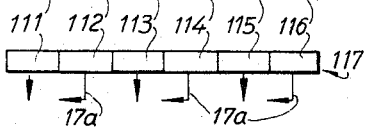
Figure 8:
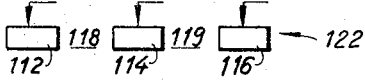
Figure 9:
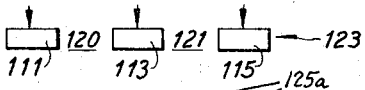

A second filter rod 110 of twelve times unit length is shown in FIG. 5. The material of the filter rod (hereinafter called black filter rod) is different from the material of the white filter rod 100. It is assumed that the material of the black filter rod 110 is more readily deformable than the material of the filter rod 100. The rod 110 is subdivided into a second group 117 of six coaxial black sections 11–116 of double unit length, see FIG. 6, this last mentioned unit length being the same as the one referred to in connection with the gaps 107–109. In the next steps, shown in FIGS. 7 to 9, the group 117 is broken up by staggering the sections 112, 114, 116 transversely with reference to the sections 111, 113, 115, or vice versa, so that the latter sections remain parallel with the former sections, and the sections 112, 114, 116 are then shifted axially (see the arrows 17a) so that each thereof is moved in transverse alignment with one of the sections 111, 113, 115. In other words, the sections 111, 112 will form a first file of transversely aligned sections, the sections 113, 114 will form a second file, and the sections 115, 116 will form a third file. The sections 112, 114, 116 constitutee a subgroup 122 wherein the adjoining sections are separated from each other by gaps 118, 119 of double unit length, each of these gaps being capable of accommodating a white section (102 or 103) of double unit length. The sections 111, 113, 115 constitute a second subgroup 123 whose sections are separated from each other by gaps 120, 121, the length of these gaps corresponding to the length of gaps 118, 119.

Figure 10:
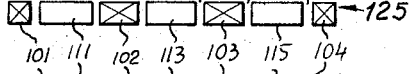
Figure 13:
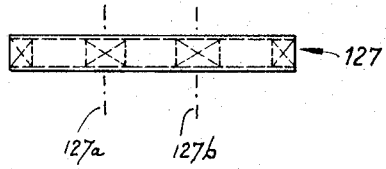

In the next-following step which is illustrated in FIG. 10, the group 106 is shuffled or interdigitated with the subgroup 123 to form an assembly 125 of coaxial rod-shaped members wherein white filters and white sections alternate with black sections. If, and as actually shown in FIG. 10, the length of the gaps 107–109 exceeds the length of the black sections 111, 113, 115 and the length of the gaps 120, 121 exceeds the length of the white sections 102, 103 the assembly 125 is preferably condensed or shortened by moving the end filters 101, 104 axially and toward each other so as to eliminate the clearances 125a, whereby the thus shortened or condensed assembly 126 (shown in FIG. 11) consists of seven abutting rod-shaped members with the end filters 101, 104 located at the opposite axial ends of the assembly 126. This assembly is contacted by a rectangular sheet 21a of adhesive-coated wrapper material, see FIG. 12, and the sheet 21a is thereupon convoluted around the assembly 126 to form therewith a composite mouthpiece 127 of sixtuple unit length which is shown in FIG. 13. The mouthpiece may be severed along lines 127a, 127b to yield three mouthpieces of double unit length each of which comprises a black intermediate section of double unit length and two white end filters of unit length. Such mouthpieces of double unit length are then arranged in a single file to be fed into spaces between consecutive pairs of coaxial tobacco rods (not shown) to form therewith filter cigarettes of double unit length in a manner well known from the art of filter cigarettes.

Figure 3:
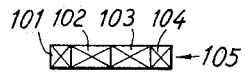
Figure 4:
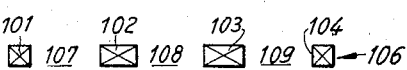

A second white filter rod 100 is then processed in the same way as shown in FIGS. 3 and 4 to form a second group 106 which is then shuffled with the subgroup 122 to form a second assembly 125. The same procedure is repeated with a third white filter rod 100 and with a second group 123 which is obtained on subdivision of a second black filter rod 110.

Figure 1:
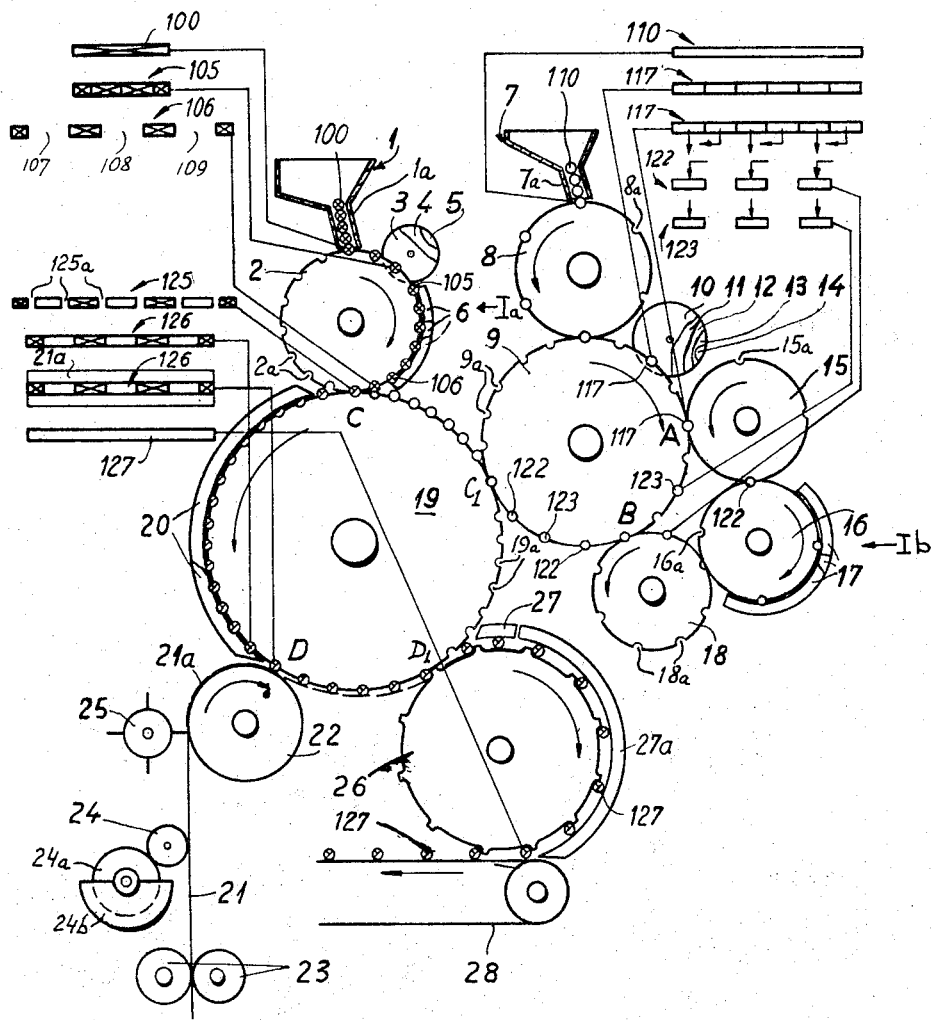
FIG. 1 is a diagrammatic side elevational view of an apparatus which is constructed in accordance with a first embodiment of my invention and is utilized in the production of duplex mouthpieces.
Figure 1A:
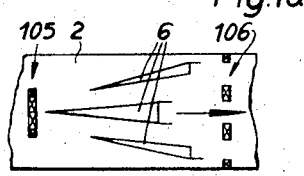
FIG. 1a is a fragmentary end elvational view as seen in the direction of the arrow Ia in FIG. 1 and illustrates a set of wedge-like cams which are used to shift the coaxial rod-shaped members of a group axially and away from each other.
Figure 1B:
FIG. 1b is a fragmentary end elevational view as seen in the direction of the arrow Ib in FIG. 1 and illustrates a set of different cams which are used to shift an entire subgroup of coaxial rod-shaped members in such a way that the length of gaps between the members remains unchanged.

An apparatus which may be utilized for practicing the method of FIGS. 2–13 is shown in FIGS. 1, 1a and 1b. This apparatus comprises a source of white filter rods 100. In the illustrated embodiment, the source of white filter rods 100 is a magazine 1 having an inclined or vertical discharge chute 1a which serves to feed white filter rods 100 seriatim into consecutive holders or pockets 2a of a conveyor here shown as a rotary drum 2. This drum rotates about a horizontal axis and is provided with equidistant axially parallel holders 2a which advance the white filter rods 100 past three coaxial rotary disk-shaped cutters 3, 4, 5 serving to subdivide such white filter rods in a manner as shown in FIG. 3. The drum 2 cooperates with fixed wedge-like spreading cams 6 (see FIG. 1a) which are located past the cutters 3–5 and serve to shift the sections 102, 103 and end filters 101, 104 axially and away from each other to thereby form the gaps 107, 108, 109. In other words, each holder 2a which has advanced past the spreading cams 6 accommodates a group 106, and each holder 2a which has advanced past the cutters 3–5 accommodates a group 105. The groups 106 are then transferred into consecutive pockets or holders 19a of an assembly conveyor here shown as a drum 19. It is clear that the drum 2 cooperates with suitable retaining shields which prevent ejection of white filter rods 100, of end filters 101, 104 and of sections 102, 103 from the holders 2a while such rod-shaped members advance from the chute 1a on to the transfer station C between the drums 2 and 19. Such retaining shields were omitted in FIG. 1 for the sake of clarity. Alternatively, the drum 2 may be a suction drum with suction ducts leading into each holder 2a to retain the rod-shaped members in such holders while the rod-shaped members advance from the discharge end of the chute 1a to the transfer station C.

The apparatus of FIG. 1 further comprises a second magazine 7 for black filter rods 110. This magazine has an inclined or vertical discharge chute 7a which feeds black filter rods 110 seriatim into consecutive pockets or holders 8a of a conveyor here shown as a drum 8. The drum 8 delivers black filter rods 110 into alternate pockets or holders 9a of a further conveyor here shown as a drum 9 which rotates in a clockwise direction, as viewed in FIG. 1, and which advances such filter rods past a series of five coaxial disk-shaped rotary cutters 10–14 serving to subdivide the rods 110 into sections 111–116, i.e., each filter rod 110 will form a group 117. The sections 111, 113, 115 (subgroups 122) are delivered into consecutive holders or pockets 15a of an intermediate conveyor in the form of a drum 15 (see the transfer station A) which in turn delivers such subgroups into consecutive pockets or holders 16a of a shifting conveyor here shown as a drum 16 cooperating with three inclined stationary shifting cams 17 (see FIG. 1b) which shift the subgroup consisting of sections 112, 114, 116 axially so that each of these sections is moved in transverse alignment with one of the sections 111, 113, 115. The distance between the sections 112, 114, 116 (gaps 118, 119) remains unchanged. The thus shifted sections of the subgroups 122 are then delivered into consecutive pockets or holders 18a of a second intermediate conveyor in the form of a drum 18 which in turn delivers such subgroups 122 into empty holders 9a of the drum 9 (see the transfer station B). In other words, each holder 9a which has advanced beyond the transfer station B accommodates a subgroup 122 or 123 whereby such subgroups alternate with each other and the sections of each subgroup 122 are in transverse alignment with the sections of each subgroup 123.

The drum 9 delivers the subgroups 122, 123 into consecutive holders 19a of the assembly drum 19 at a transfer station $C_1$ which is located upstream of the transfer station C. Thus, at the time a holder 19a has advanced past the transfer station C, it accommodates an assembly 125 wherein the adjoining rod-shaped members are separated from each other by narrow clearances 125a and wherein white rod-shaped members alternate with black rod-shaped members. The assembly drum 19 cooperates with two suitably inclined arcuate condensing or compressing cams 20 which engage the outer end faces of consecutive end filters 101, 104 and move them toward each other to thereby transform the assemblies 125 into assemblies 126 of the type shown in FIG. 11. Thus, the cams 20 serve to eliminate the clearances 125a. The cams 20 are comparatively long so that the rod-shaped members of the groups 125 are shifted gradually and the assemblies 125 are transformed into assemblies 126 before the corresponding holders 19a reach a transfer station D at which each such assembly receives a rectangular wrapper sheet 21a. The sheets 21a are obtained by subdivision of a wrapper tape 21 which is uncoiled from a suitable reel (not shown) and is advanced by a pair of cooperating advancing rolls 23 one of which is driven in a manner not illustrated in FIG. 1. The leading end of the tape 21 then passes along a roller-shaped applicator 24 which is coated with adhesive by a transfer roller 24a dipping into a paster tank 24b. The applicator 24 coats one side of the tape then advances toward the periphery of a conveyor in the form of a suction drum 22 which cooperates with a bladed rotary knife 25 serving to sever the tape at regular intervals to thereby form the wrapped sheets 21a. In a manner well known in the art, the peripheral speed of the suction drum 22 exceeds the forward speed of the tape 21 so that the sheets 21a are automatically spaced from each other to be applied to consecutive assemblies 126. Such assemblies are then advanced by holders 19a to a further transfer station $D_1$ to be delivered onto the periphery of a wrapping conveyor here shown as a drum 26. The drum 26 cooperates with a fixed wrapping member 27 to convolute the sheets 21a and to transform each assembly 126 into a mouthpiece 127 of sextuple unit length. The thus obtained mouthpieces 127 are retained by a fixed arcuate shield 27a and are allowed to descend onto the upper stringer of an endless take-off conveyor belt 28.

All of the conveying drums shown in FIG. 1 (with the exception of the drums 22, 26) are provided with axially parallel holders, and all such drums rotate about parallel axes. The distance $t$ between the holders on the drum 2 is the same as the distance between the holders of the drums 9, 18 and 19, and the distance $2t$ between the holders of the drum 8 is the same as the distance between the holders of the drums 15 and 16. All of the drums are driven at the same peripheral speed by a system of meshing gears, sprockets and chains, or belts and pulleys in a manner not forming part of the present invention and well known from the art of conventional cigarette machines or filter cigarette machines.

The apparatus of FIG. 1 operates in a manner which will be readily understood by referring to the description of the method whose steps are illustrated in FIGS. 2 to 13. Thus, the chute 1a discharges white filter rods 100 into consecutive holders 2a, and the filter rods are subdivided by cutters 3–5 to form groups 105. Such groups are then advanced past the cams 6 to form groups 106 wherein the end filters 101, 104 and intermediate sections 102, 103 are separated from each other by gaps 107–109. The manner in which a drum may cooperate with a series of rotary cutters and with wedge-like cams is disclosed, for example, in U.S. Patent No. 2,994,251 and in the application Serial No. 153,926 of Willy Rudszinat et al. Of course, the axial position of the chute 1a with reference to the holders 2a and the position of the cams 6 with reference to the drum 2 will be selected in such a way that the rod-shaped members 102, 103 of consecutive groups 106 automatically enter the gaps 118, 119 or 120, 121 of consecutive subgroups 122, 123.

The chute 7a of the second magazine 7 discharges black filter rods 110 into consecutive holders 8a of the drum 9 which feeds such filter rods into alternate holders 9a. The rods 110 are subdivided by cutters 10–14 to yield sections 111–116 and the thus obtained groups 117 are then advanced to the transfer station A at which the subgroups 122 of each consecutive group 117 are removed by suction or by mechanical means to enter consecutive holders 15a of the drum 15. The subgroups 122 are then transferred into consecutive holders 16a of the drum 16 to be shifted by the cams 17 so that the holders 18a of the drum 18 receive axially shifted subgroups 122 whose sections are in transverse alignment with the sections of the subgroups 123. At the station B, the subgroups 122 enter the empty holders 9a to be advanced on to the transfer station $C_1$ and into the holders 19a of the assembly drum 19. As explained hereinabove, the holders 19a receive alternatingly subgroups 122, 123 and advance such subgroups to the transfer station C to receive groups 106 whereby each group 106 is automatically shuffled with a subgroup 122 or 123 to form an assembly 125. Such assemblies are condensed by the cams 20 to form the assemblies 126 prior to reaching the transfer station D at which each assembly 126 receives an adhesive-coated wrapper sheet 21a delivered by the suction drum 22. Such wrapper sheets 21a are formed by the blades of the knife 25 whereby the drum 22 serves as an anvil and supports the non-coated side of the tape 21, the other side of the tape having been coated by the applicator 24.

The sheets 21a are convoluted while the corresponding assemblies advance through the arcuate gap between the periphery of the wrapping drum 26 and the fixed wrapping member 27. The exact construction of the wrapping drum 26 forms no part of the present invention. This drum may be constructed in a manner as disclosed, for example, in my U.S. Patent No. 3,001,528 or 3,137,302. The shield 27a then holds the mouthpieces 127 against the periphery of the drum 26 while the mouthpieces advance toward the upper stringer of the take-off belt 28. The belt 28 may deliver the mouthpieces to storage, past a set of cutters which subdivide the mouthpieces 127 into mouthpieces of double unit length, or to a filter cigarette machine.

Figure 11:
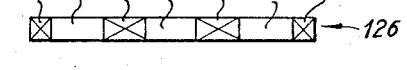
Figure 12:
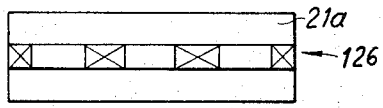
Figure 26:
Figure 27:

FIGS. 15 to 27 illustrate the steps of a modified method which is resorted to in the production of composite mouthpieces of the type wherein a granular filter consisting of activated charcoal or similar comminuted filter material is located between a pair of rod-shaped end filters of unit length. The steps illustrated in FIGS. 15 through 23 respectively correspond to those shown in FIGS. 2 through 10. Thus, by subdividing a white filter rod 100 of sextuple unit length and a black filter rod 110 of twelve times unit length, and by thereupon shuffling the black sections 111, 113, 115 or 112, 114, 116 with white end filters 101, 104 and white sections 102, 103, one obtains an assembly 125 wherein white rod-shaped members alternate with black rod-shaped members, wherein the end filters 101, 104 of unit length are located at the ends of the assembly 125, and wherein the adjoining rod-shaped members are separated from each other by clearances 125a which are preferably of identical length, as seen in the axial direction of the assembly. However, instead of moving the end filters 101, 104 toward each other in a manner as shown in FIG. 11 and as effected by the condensing cams 20 to FIG. 1, the assembly 125 is connected to a rectangular sheet 21a of wrapper material (see FIG. 24) and this wrapper material is partially convoluted around the assembly 125 to form therewith an assembly 132. The wrapper sheet 21a then forms a substantially V-shaped or U-shaped body and the clearances 125a are transformed into open-sided pockets 133 (see FIG. 25) which are ready to receive measured quantities of granular filter material 32 in a manner as shown in FIG. 26. The thus obtained assembly 134 is then transformed into a composite mouthpiece 135 of sixtuple unit length, see FIG. 27, which may be subdivided into three mouthpieces of double unit length by severing it along the line 135a, 135b. Each such mouthpiece of double unit length will comprise a centrally located black section of double unit length flanked by two granular filters 32 of unit length and by two white end filters of unit length. Such mouthpieces may be fed into a filter cigarette machine to be inserted between pairs of coaxial tobacco rods in order to form therewith filter cigarettes of double unit length. It will be noted that the basic difference between the methods of FIGS. 2–13 and 15–27 resides in that the former is resorted to in the production of duplex mouthpieces consisting solely of rod-shaped members and the latter furnishes triplex mouthpieces wherein a centrally located granular filter of unit length is flanked by two rod-shaped filters of unit length but consisting of different materials. This will be readily understood since, by halving any one of the three mouthpieces of double unit length which may be obtained by severing the mouthpiece 135 of FIG. 27, one will obtain two triplex mouthpieces of unit length each comprising a white end filter, a black end filter and a granular intermediate filter of unit length. Of course, the unit length referred to in connection with the granular intermediate filter need not be the same as the unit length of a white or black end filter, and black filter of unit length may differ in length from a white filter of unit length. In other words, the unit length of each filter may be different.

Figure 14:
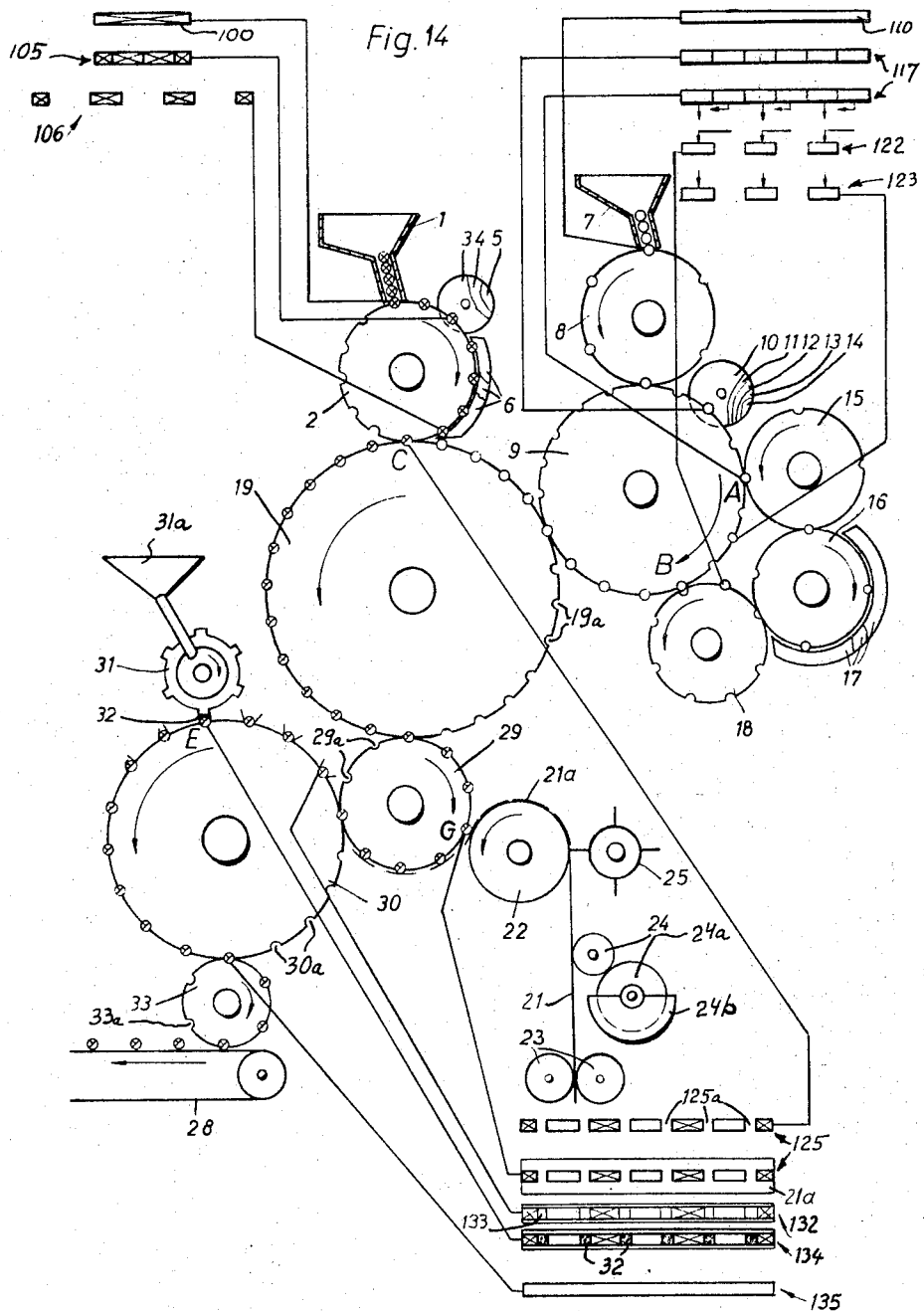
FIG. 14 is a diagrammatic side elevational view of a second apparatus which is utilized for the production of triplex mouthpieces including filters consisting of granular material.
Figure 15:
FIGS. 15 through 27 illustrate the steps of the method which may be carried out by resorting to the apparatus of FIG. 14.
Figure 16:
Figure 17:
Figure 18:
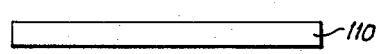
Figure 19:
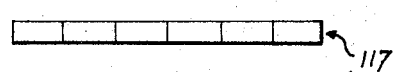
Figure 20:
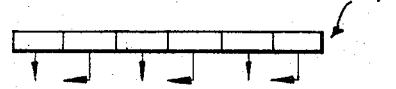
Figure 21:
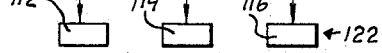
Figure 22:
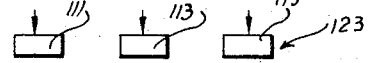

The apparatus which may be used for practicing the method of FIGS. 15–27 is illustrated in FIG. 14. Certain component parts of this apparatus are identical with those which were described in connection with FIG. 1 and are identified by similar reference numerals. The main difference between the two apparatus is that the apparatus of FIG. 14 comprises a different wrapping drum 30 and that this second apparatus comprises two assembly drums including the drum 19 and a second assembly drum 29 whose pockets or holders 29a receive assemblies 125 from the holders 19a and which also receives wrapper sheets 21a from the suction drum 22. The assemblies 125, each with a wrapper sheet 21a attached thereto, are then transferred into the pockets or holders 30a of the wrapping drum in such a way that the sheets 21a are transformed into substantially U-shaped or V-shaped bodies so that the clearances 125a form pockets 133 which are ready to receive measured quantities of granular filter material 32 from a suitable filling device 31 of the type disclosed, for example, in the copending application Serial No. 384,131 of Carl Stelzer. The filling device 31 is located at a level above the wrapping drum 30 so that the granular filter material 32 may descend by gravity, and the drum 30 is provided with pairwise arranged wrapping members of the type disclosed, for example, in my U.S. Patent No. 2,714,384, to complete the wrapping operation. The wrapping members convolute the sheets 21a around the respective assemblies 125 so that each assembly 132 (advancing toward the filling station E) is first transformed into an assembly 134 and each assembly 134 is thereupon transformed into a triplex mouthpiece 135 of sextpule unit length. Such mouthpieces are delivered into the holders 33a of a transfer drum 33 which delivers them onto the upper stringer of the belt 28.

Figure 23:
Figure 24:

It will be noted that the drum 19 of FIG. 14 is without cams 20 because the clearances 125a shown in FIG. 23 should remain to form the pockets 133 which are then filled with granular filter material 32. The spacing between the holders of the drums 29, 30, 33 is the same as the spacing between the holders 19a.

The operation of the apparatus shown in FIG. 14 will be readily understood upon perusal of the description of FIGS. 15 to 27. Thus, and since the cams 20 are dispensed with, the groups 106 which are shuffled with the subgroups 122 or 123 form assemblies 125 with clearances 125a which remain unchanged as the assemblies 125 advance toward the transfer station between the assembly drums 19, 29. The suction drum 22 applies the sheets 21a at the station G in such a way that each sheet is substantially tangential with reference to the corresponding assembly 125, and such sheets are then deformed to form U-shaped or V-shaped bodies in response to transfer of assemblies into the holders 30a of the wrapping drum 30. Each clearance 125a then forms an open-sided pocket or compartment 133 which can receive granular filter material 32, preferably activated charcoal delivered in measured quantities by the filling device 31 which cooperates with a suitable source 31a. The wrapping members of the drum 30 complete the formation of mouthpieces 135 by fully convoluting each sheet 21a around the respective assembly 125, and the drum 33 transfers such mouthpieces onto the belt 28 which conveys them to storage or to a further processing station.

Figure 25:

If the filling device 31 is omitted or arrested, the apparatus of FIG. 14 will produce composite filter mouthpieces wherein the adjoining rod-shaped members are separated by air-filled clearances or pockets 133 (FIG. 25). Such pockets serve as turbulence chambers and contribute to the filtering effect of the mouthpiece. It is also clear that the pockets 133 may be filled with a third filter material which may be introduced in the form of short rods, for example, rods consisting of bonded charcoal or of fibers mixed with charcoal granules. It is equally obvious that one of the filter rods may be a hollow tube which will form in the mouthpiece 127 or 135 a series of turbulence chambers in the same way as if the cams 20 of FIG. 1 were dispensed with, i.e., as if the clearance 125a were to remain in the ultimate product. If the filters consisting of such tubular stock are located at the ends of a mouthpiece, the latter is of the so-called recessed type wherein the filter material remains spaced from the tongue of the smoker. Such hollow tubular filter rods may consist of cardboard or similar paper-like material.

Figure 28:
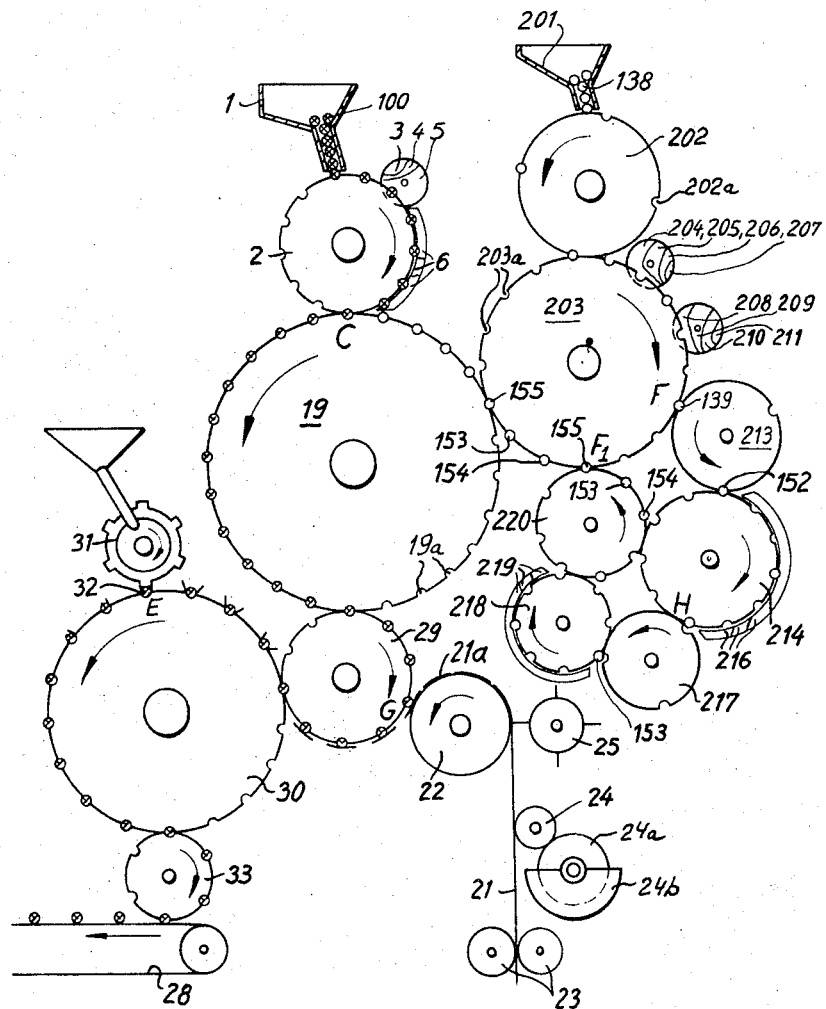
FIG. 28 is a diagrammatic side elevational view of an apparatus for the production of triplex mouthpieces which constitutes a modification of the apparatus shown in FIG. 14.

The third apparatus which is shown in FIG. 28 is quite similar to the one which is illustrated in FIG. 14 with the important difference that this third apparatus processes black filter rods 138 of eighteen times unit length. Such filter rods 138 are discharged seriatim by a magazine 201 and enter consecutive holders 202a of a drum 202. The holders 202a deliver such rods into each third holder 203a of a further drum 203 which cooperates with two rows or sets of rotary disk-shaped cutters including a first set or row consisting of coaxial cutters 204–207 and a second set or row consisting of coaxial cutters 208–211. These cutters subdivide each consecutive black filter rod 138 into a group 139 of nine coaxial black sections 140–148 of double unit length (see FIG. 33), and the sections 140, 143, 146 (forming a subgroup 155) continue to travel with the drum 203 whereas the sections 141, 142, 144, 145, 147, 148 (subgroups 152) enter consecutive holders of a drum 213 (see the transfer station F) which delivers them to each third holder of a shifting drum 214. The drum 214 cooperates with three inclined shifting cams 216 (corresponding to the cams 17 of FIG. 1 or 1b) which shift the pairs of sections 141–142, 144–145 and 147–148 axially without changing the distance therebetween. The inclination of the cams 216 is such that the sections 141, 144, 147 (subgroups 154) are respectively moved in transverse alignment with the sections 140, 143, 145 (subgroups 155). The drum 214 delivers such sections 141, 144, 147 into each third holder of a further drum 220. At the transfer station H, the sections 142, 145, 148 (subgroups 153) are transferred into consecutive holders of a drum 217 which delivers them into each third holder of a shifting drum 218 cooperating with inclined cams 219 serving to shift the sections 142, 145, 148 (subgroups 153) axially without changing the spacing therebetween so that these sections are respectively moved in transverse alignment with the sections 140, 143, 146 (subgroups 155) and thereupon enter each third holder of the drum 220. Thus, each third holder of the drum 220 will remain empty but the remaining two holders will respectively receive three sections 141, 144, 147 (subgroup 154) or 142, 145, 148 (subgroup 153). At a station $F_1$, the drum 220 delivers such sections into momentarily aligned holders of the drum 203 so that, as the holders 203a advance beyond the station $F_1$, each thereof accommodates three black sections whereby each section in any given holder 203a is in transverse alignment with a section in the preceding holder. In other words, the sections 140–148 then form three files of sections or a single file of subgroups which are advanced toward the station C where they are shuffled with the groups 106 to form assemblies 125 which are then processed to form mouthpieces 135 in the same way as described in connection with FIG. 14. The reference character G indicates the transfer station between the suction drum 22 and the second assembly drum 29.

The operation of the apparatus shown in FIG. 28 will be best understood with reference to FIGS. 29 to 42. The magazine 1 delivers white filter rods 100 (see FIG. 29) which are then severed by the cutters 3, 4, 5 to form groups 105 (FIG. 30) which are transformed into groups 106 (FIG. 31) while advancing past the shifting cams 6. At the station C, the groups 106 are transferred into consecutive holders 19a of the first assembly drum 19.

The magazine 201 discharges black filter rods 138 (FIG. 32) which are advanced past the cutters 204–207 and 208–211 to yield groups 139 (FIGS. 33 and 34) of nine black sections 140–148, i.e., the number of sections in each group 139 is three times the number of gaps 107–109 in a group 106. At the transfer station F of FIG. 28, the subgroups 152 (consisting of sections 141, 142, 144, 145, 147, 148) are transferred into consecutive holders of the drum 213 (FIG. 35a) but the subgroups 155 (consisting of sections 140, 143, 146 which are separated by gaps 150, 151) remain in the holders 203a and advance toward and past the transfer station $F_1$, see FIG. 35. The drum 213 transfers the subgroups 152 (whose pairwise arranged sections are separated by gaps 156, 157) into the holders of the drum 214 which moves them past the cams 216 (FIG. 36) whereby the sections 141, 144, 147 are respectively moved in transverse aligment with the sections 140, 143, 146, see the arrows 126a in FIG. 35a. At the station H, the sections 142, 145, 148 are transferred into the holders of the drum 217 to form subgroups 153 (FIG. 37a) whereas the sections 141, 144, 147 remain in the holders of the drum 214 to form subgroups 154 (FIG. 37) which are thereupon delivered into the holders of the drum 220. The drum 217 delivers the subgroups 153 into the holders of the drum 218 which moves them past the cams 219 so that the sections are shifted axially (see the arrows 219a in FIG. 37a) while the length of gaps 136, 137 between such sections remains unchanged. In the new positions shown in FIG. 37b, the sections 142, 145, 148 are respectively in transverse alignment with the sections 140, 143, 146 and are transferred into the holders of the drum 220 which deposits them in the holders of the drum 203 (station $F_1$) so that each holder of the drum 203 advancing past the station $F_1$ accommodates a subgroup 153, 154, or 155. Such subgroups are then shuffled with consecutive groups 106 (see FIG. 38 and the station C in FIG. 28) to form therewith assemblies 125 each including two white end filters 101, 104, two intermediate white sections 102, 103, and three black sections 140, 143, 146 (subgroup 155) or 141, 144, 147 (subgroup 154) or 142, 145, 148 (subgroup 153) with clearances 125a between each pair of adjoining rod-shaped members. The assemblies 125 are transferred into the holders of the second assembly drum 29 which moves them past the station G where each such assembly receives a wrapper sheet 21a (FIG. 39) which is transformed into a U-shaped or V-shaped body on transfer into a holder of the wrapping drum 30 (FIG. 40). The thus deformed sheets 21a transform the clearances 125a into open-sided pockets 133 which receive measured quantities of granular filter material 32 (FIG. 41 and the station E in FIG. 28), and the wrapping drum 30 then completes the convolution of sheets 21a to form the mouthpieces 135 (FIG. 42). Such mouthpieces are transferred into the holders of the drum 33 which delivers them into the upper stringer of the belt 28.

The spacing $t$ between the holders of the drum 2 is the same as the spacing between the holders of the drums 19, 29, 30, 33, 203, 214, 218 and 220. The spacing $3t$ between the pockets of the drum 202 is the same as the spacing between the holders of the drums 213 and 217. All drums (excepting the drum 22) are driven at the same peripheral speed. It is clear that the length of the gaps 107–109 exceeds the axial length of a black section and that the length of gaps 150, 151, 136, 137, 128, 129 exceeds substantially the length of a white section. The length of the gaps 156, 157 shown in FIG. 36 equals the length of a black section. Since the gaps 128, 129, 136, 137, 150, 151 are quite long, the shuffling of groups 106 with the subgroups 153, 154, 155 presents no problems.

Figure 43:
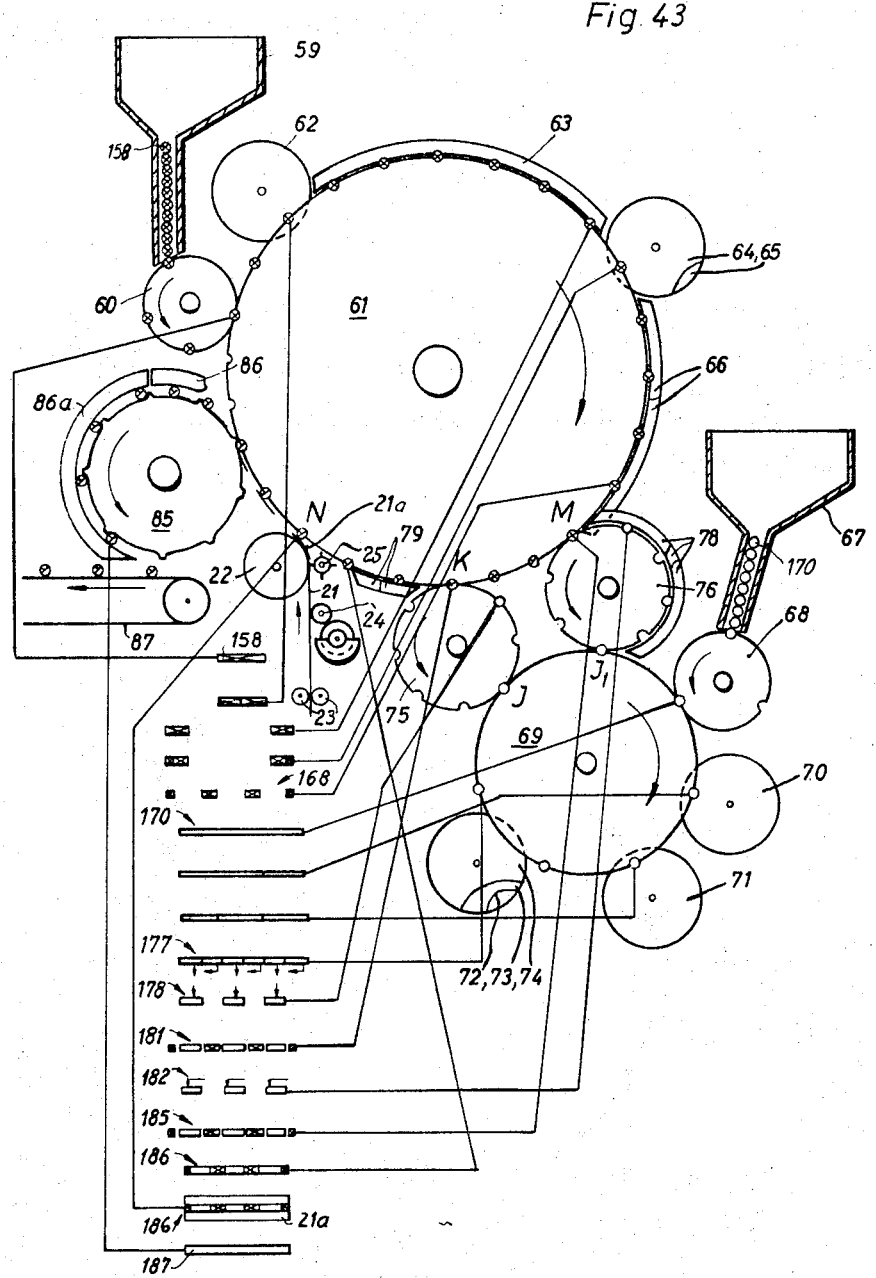
FIG. 43 illustrates a fourth apparatus which constitutes a modification of the apparatus shown in FIG. 1.

The apparatus of FIG. 43 resembles somewhat the apparatus of FIG. 1. The main difference is that the apparatus of FIG. 43 comprises an assembly drum 61 which receives subgroups 178, 182 of black filter sections of double unit length at two different transfer stations K, M. A magazine 59 discharges white filter rods 158 of sixtuple unit length (see also FIG. 44) which enter consecutive holders of an inserting drum 60. This drum delivers the filter rods 158 into consecutive holders of the assembly drum 61 which rotates in a clockwise direction, as viewed in FIG. 43, and advances the filter rods past a rotary disk-shaped cutter 62 so that each filter rod yields two white sections 159, 160 of triple unit length (see FIG. 45). The thus obtained sections 159, 160 are advanced past a wedge-like shifting cam 63 which moves them axially and away from each other to form a long gap 158a shown in FIG. 46, and the sections 159, 160 are then moved along a pair of axially spaced rotary disk-shaped cutters 64, 65 which sever them in such a way that the section 159 yields an end filter 161 of unit length and a section 162 of double unit length whereas the section 160 yields an end filter 164 of unit length and a section 163 of double unit length (see FIG. 47). While continuining to advance with the assembly drum 61, the sections 162, 163 are respectively engaged by two stationary shifting cams 66 which move them axially and away from the end filters 161, 164 to transform the gap 158a into three gaps 165, 166, 167 of at least double unit length. One of the thus obtained groups 168 is shown in FIG. 48. In other words, on moving past the cams 66, each holder of the assembly drum 61 accommodates a group 168 consisting of two end filters 161, 164 and two intermediate sections 162, 163.

A second magazine 67 which is adjacent to the assembly drum 61 accommodates a supply of black filter rods 170 of twelve times unit length (see also FIG. 49). Such filter rods are fed into consecutive holders of a drum 68 which feeds the filter rods into consecutive holders of a further drum 69. The latter drum cooperates with five rotary disk-shaped cutters 70, 71 and 72–74 which subdivide the rods 170 into groups 177 (see FIG. 50) of six coaxial black sections 171–176 of double unit length. Such groups 177 then advance toward a transfer station J between the drum 69 and an inserting drum 75 whose holders receive subgroups 178 consisting of axially spaced sections 171, 173, 175 (FIG. 52). It will be noted that the holders of the drum 69 feed subgroups 178 into alternate holders of the inserting drum 75. At the station K, the subgroups 178 are shuffled with the corresponding groups 168 to form assemblies 181 (see FIG. 53) whose rod-shaped members are separated by clearances 181a. The subgroups 182 (consisting of sections 172, 174, 176) continue to advance with the drum 69 on to a transfer station $J_1$ where they enter alternate holders of a shifting drum 76. This drum cooperates with three inclined shifting cams 78 which move the sections 172, 174, 176 axially (see the arrows 78a in FIG. 51) so that such sections are respectively moved in transverse alignment with the sections 171, 173, 175 (see FIG. 54). At the transfer station M, the holders of the drum 76 deliver the subgroups 182 into momentarily aligned holders of the assembly drum 61 whereby the subgroups 182 are shuffled with the corresponding groups 168 to form assemblies 185 shown in FIG. 55. Each assembly 185 is identical with an assembly 181 by consisting of alternating white and black rod-shaped members which are separated from each other by clearances 185a corresponding to the clearances 181a. After advancing past the transfer station K, each holder of the assembly drum 61 accommodates an assembly 181 or 185 whereby such assemblies alternate with each other and move past a pair of fixed condensing or compressing cams 79 which engage the end filters 161, 164 and move them axially toward each other to eliminate the clearances 181a and 185a. The thus obtained condensed assemblies 186 (see FIG. 56) correspond to the assemblies 126 one of which is shown in FIG. 11. The suction drum 22 then applies to each consecutive assembly 186 a rectangular wrapper sheet 21a (see FIG. 57), and such assemblies are then transferred onto a wrapping drum 85 (corresponding to the wrapping drum 26 of FIG. 1) which convolutes the sheets 21a around the respective assemblies 186 to form duplex mouthpieces 187 (FIG. 58) of sextuple unit length. The wrapping drum 85 cooperates with a fixed wrapping member 86 corrseponding to the wrapping member 27 of FIG. 1 and with retaining shields 86a which assist the wrapping drum in transferring the mouthpieces 187 onto the upper stringer of a take-off belt 87. The distance $t$ between the holders of the drum 60 is the same as the distance between the holders of the drums 61, 75, 76, and the distance $2t$ between the holders of the drum 68 is the same as the distance between the holders of the drum 69. The arrangement for coating one side of the tape 21 with adhesive paste is the same as the one which was described in connection with FIG. 1.

The apparatus of FIG. 43 operates as follows:

As shown in FIGS. 44, 45 and 46, the rods 158 are advanced past the cutter 62 and thereupon the cam 63 to yield sections 159, 160 of triple unit length which are separated from each other by gaps 158a. Such sections remain coaxial to each other and advance along the cutters 64, 65 (FIG. 47) to respectively yield rod-shaped members 161, 162 and 163, 164 which are then moved past the cams 66 to form groups 168 wherein the end filters 161, 164 and sections 162, 163 are separated from each other by gaps 165, 166, 167, see FIG. 48.

The magazine 67 feeds black filter rods 170 (FIG. 49) which are advanced past the cutters 70, 71 and 72–74 so that each thereof yields a group 177 of six coaxial black sections 171–176 (FIGS. 50 and 51). Thus, the number of black sections 171–176 is twice the number of gaps 165–167 between the components of a group 168. The subgroups 178 (FIG. 52) consisting of sections 171, 173, 175 are removed from the drum 69 at the station J and travel with the holders of the drum 75 to enter the station K and to be shuffled with alternate groups 168 on the assembly drum 61. The length of gaps 179, 180 (FIG. 52) between the black sections 171, 173, 175 of the subgroups 178 at least equals the length of a white section 162 or 163 so that such gaps are only partially filled with white filter rod material and, together with the remainder of the gaps 165, 166, 167, form the aforementioned clearances 181a (FIG. 53).

The subgroups 182 (FIG. 54) continue to advance with the holders of the drum 69 on to the transfer station $J_1$ where the sections 172, 174, 176 enter alternate holders of the drum 76 whereby the sections of each subgroup 182 define between themselves a pair of gaps 183, 184. The cams 78 shift the sections of subgroups 182 axially as indicated in FIG. 51 by the arrows 78a and the thus shifted subgroups 182 then advance to the station M where they enter alternate holders of the assembly drum 61 to be shuffled with the corresponding groups 168 and to form the assemblies 185 (FIG. 55). During such shuffling, the sections 172, 174, 176 enter the gaps 165, 166, 167, and the sections 162, 163 enter the gaps 183, 184. The assemblies 181, 185 are condensed while advancing past the cams 79 to form assemblies 186 which receive wrapper sheets 21a at the station N and are then transferred into the spaces between the projections or ribs of the wrapping drum 86a. This drum cooperates with the fixed wrapping member 86 to complete the convoluting operation whereby each assembly 186 forms a duplex mouthpiece 187 of sixtuple unit length. Such mouthpieces are transferred onto the upper stringer of the belt 87.

A very important advantage of the apparatus which is shown in FIG. 43 is that the number of transfer stations for the rod-shaped members 171–176 is reduced to a minimum. This is of importance because the members are less likely to undergo deformation. It will be noted that the members of the subgroups 178, 182 must be transferred at two stations J, K and $J_1$, M respectively.

Figure 59:
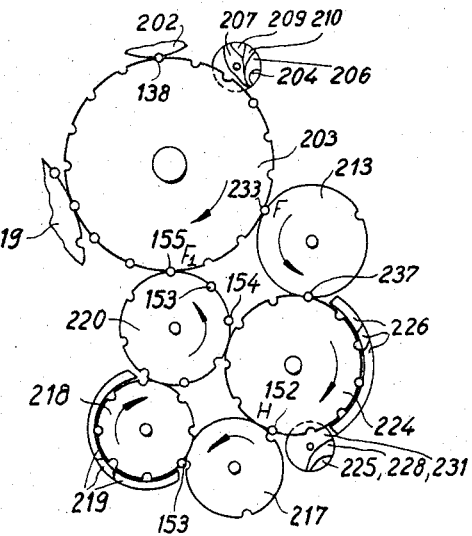
FIG. 59 illustrates a portion of an apparatus which constitutes a slight modification of the apparatus shown in FIG. 28.
Figure 60:
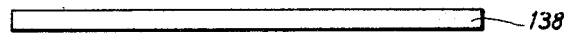
FIGS. 60 through 68 illustrate certain steps of the method which may be carried out by resorting to the apparatus of FIG. 59.
Figure 61:
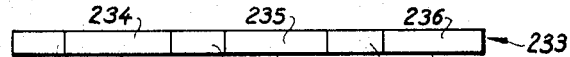
Figure 62:
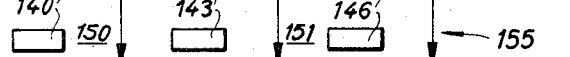
Figure 63:
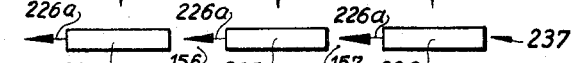
Figure 64:
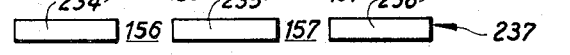
Figure 65:
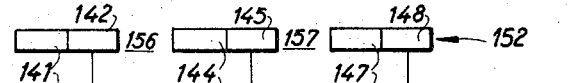

FIG. 59 illustrates a portion of an apparatus which constitutes a slight modification of the apparatus shown in FIG. 28. More particularly, the structure shown in FIG. 59 serves to manipulate the black filter rods 138 (see FIG. 60) in a manner somewhat different from the manner described in connection with FIGS. 32 to 37b. The drum 202 delivers filter rods 138 into each third holder of the drum 203 which cooperates with a row of five rotary disk-shaped cutters 204, 206, 207, 209, 210 so as to subdivide each filter rod into six sections including sections 140, 143, 146 of double unit length and sections 234, 235, 236 of quadruple unit length. Such sections form groups 233 one of which is shown in FIG. 61. The sections 140, 143, 146 of each group 233 form a subgroup 155 (FIG. 62) which advances past the transfer station F but the sections 234, 235, 236 (forming subgroups 237 shown in FIG. 63) are transferred into the holders of the drum 213 which delivers them into the holders of the shifting drum 224. The latter cooperates with cams 226 which shift the sections 234–236 axially (see the arrows 226a in FIG. 63) so that the length of gaps 156, 157 remains unchanged. The length of such gaps corresponds to the length of gaps 150, 151 between the sections 234–236. The new axial position of a subgroup 237 which has advanced past the cams 226 is shown in FIG. 64. Such subgroups then advance past a row of three rotary disk-shaped cutters 225, 228, 231 which cooperate with the drum 224 to sever the sections 234, 235, 236 whereby these sections respectively yield pairs of sections 141–142, 144–145 and 147–148 (FIG. 65). The sections 141, 144, 147 form subgroups 154 (FIG. 66) which advance with the drum 224 past the station H and are transferred into alternate pockets of the drum 220. The remaining sections 142, 145, 148 form subgroups 153 (FIG. 67) which are transferred into each third pocket of the drum 218. The latter cooperates with cams 219 which shift the sections 142, 145, 148 axially (see the arrows 219a in FIG. 67) so that each of these sections is moved in transverse alignment with one of the sections forming a subgroup 154 or 155. When the subgroups 153 reach the positions shown in FIG. 68, they enter alternate holders of the drum 220 which delivers them to the transfer station $F_1$. At this same station, the drum 220 delivers the subgroups 154 into each third holder of the drum 203. The drum 220 then transfers the subgroups 153, 154, 155 into consecutive holders of the assembly drum 19.

The distance t between the holders of the drum 19 is the same as that between the holders of the drums 202, 203, 224, 218 and 220. The distance 3t between the holders of the drum 213 is the same as that between the holders of the drum 217. The axial length of the gaps 150, 151 between the sections of subgroups 155 (FIG. 62) is the same as the length of gaps 128, 129 between the sections of subgroups 154 (FIG. 66) or the length of gaps 136, 137 between the sections of the sub groups 153 (FIG. 67 or 68). Once the subgroups 153, 154 155 enter the holders of the assembly drum 19, they are shuffled, wrapped and otherwise processed in the same way as described in connection with FIGS. 28–42.

The two rows of cutters complete the subdivision of filter rods 138 in two stages, namely, in a first stage which is completed while the rods 138 advance past the cutters 204, 206, 207, 209, 210 and a second stage while the subgroups 237 advance past the cutters 225, 228, 231. Such staggering of cutters is desirable because their edges must be sharpened during each revolution and there is no room to place more than about five sharpeners in a single row, especially if the distance between the adjoining cutters is rather small, i.e., if the sections 140–148 are short.

Referring finally to FIGS. 68 to 71, there is shown a conveyor which may be utilized for advancing and for simultaneously shifting a subgroup of coaxial rod-shaped members while such members travel in an elongated arcuate path between a first transfer station O where they enter consecutive holders 261 and a second transfer station P where they leave the respective holders 261 to be transferred into the holders of another conveyor, for example, into the holders 18a of the intermediate drum 18 shown in FIG. 1. The conveyor of FIGS. 69 to 71 may be used as a substitute for the drum 16 and shifting cams 17 of the apparatus shown in FIG. 1, for the drum 214 and cams 216 or for the drum 218 and cams 219 of the apparatus shown in FIG. 28, for the drum 76 and cams 78 of the apparatus shown in FIG. 43, and for the drum 224 and cams 226 or for the drum 218 and cams 219 of the structure shown in FIG. 59. The conveyor comprises a substantially cup-shaped drum 250 having a hollow cylindrical mantle 250b one axial end of which may remain open, as at 250a, and the other axial end of which is closed by an annular end wall 251. The end wall 251 is connected with a hollow drive shaft 252 which is fixed thereto by bolts and nuts 252a and which accommodates a stationary supporting shaft 253. Antifriction bearings 254, 255 reduce friction when the drive shaft 252 rotates with reference to the supporting shaft 253, and the shaft 252 is driven by the main drive of the apparatus in which the drum 250 is put to use. The end portion of the supporting shaft 253 extends into the interior of the mantle 250b and carries a disk-shaped cam 256 which is detachably secured thereto by a nut 257 so that it may be readily separated from the shaft 253. The nut 257 is accessible through the open axial end 250a and the peripheral portion of the cam 256 is provided with an endless cam groove 258 which accommodates a plurality of equidistant radially extending followers 262, one for each holder 261. The connection between the cam 256 and supporting shaft 253 is such that the cam is held against any axial and/or angular displacement, i.e., the cam is stationary while the drum 250 is free to rotate thereabout.

The periphery of the mantle 250b is provided with a series of equidistant axially extending grooves 259 each of which receives a holder 261. These holders resemble elongated carriages or slides which are freely movable in the axial direction of the respective grooves 259, and each holder 261 is provided with a semicylindrical recess adapted to accommodate a single rod-shaped member or a subgroup of rod-shaped filter members, for example, a subgroup 122 or 123 of the type shown in FIG. 8 or 9. The mantle 250b is further provided with radially extending through slots 263 which communicate with the respective grooves 259 and which extend in the axial direction of the drum. Each such slot 263 accommodates the stem of a roller follower 262 whose enlarged head extends into the cam groove 258 and whose stem is threadedly secured to the corresponding holder 261. Thus, when the drum 250 rotates with reference to the supporting shaft 253 and cam 256, the followers 262 will travel in the cam groove 258 and will effect axial movement of the holders 261 in the respective grooves 259 so that the subgroups received in the recesses 260 will share such axial movements and will be shifted axially while moving from the transfer station O to the transfer station P. Each slot 263 comprises an enlarged end portion 263a, see FIG. 71, which is large enough to permit insertion or withdrawal of the head on the corresponding follower 262, i.e., such followers may be withdrawn merely by moving them in registry with the enlarged portions 263a. When the stem of a follower 262 extends into the narrow portion of the corresponding slot 263, it automatically retains the associated holder 261 in the corresponding groove 259.

The drum 250 cooperates with three arcuate retaining rails 264 which extends between the stations O and P and serve to prevent ejection of subgroups (and more particularly of rod-shaped members which constitute such subgroups) when the drum rotates in response to rotation of the drive shaft 252. The rails 264 are fixed to stationary supporting rods 266.

If the operator desires to replace the cam 256 by a different cam, for example, when the subgroups should be shifted through a greater or lesser axial distance, the nut 257 is removed through the open axial end 250a and the drum is rotated with reference to the cam to move the heads of followers 262 in registry with the enlarged portions 263a of the corresponding slots 263 so that the followers can be withdrawn radially outwardly together with the associated holders 261. The cam 256 is then ready to be withdrawn through the open axial end 250a.

The conveyor of FIGS. 69 to 71 operates as follows:

At the station O, the recesses 260 of consecutive holders 261 receive subgroups consisting of three or more rod-shaped members 265 which are equidistant from each other. The drum 250 rotates in a clockwise direction (arrow 267) and advances the rod-shaped members 265 into the gaps between the periphery of its mantle 250b and the inner sides of the retaining rails 264 so that the members 265 are held against the action of centrifugal force and advance toward the station P. At the same time, the members are shifted axially as a unit because the followers 262 track the walls surrounding the groove 258 of the cam 256 so that the axial position of each holder 261 (and of the corresponding subgroup) changes automatically on its way from the station O to the station P. The centers of curvature of the rails 264 lie on the axis of the drum 250; in addition, the rails 264 are curved in the same way as the path in which the rod-shaped members 265 should advance from the station O to the station P. Therefore, the members 265 are held against movement with reference to their holders 261 and the spacing between the members of each subgroup remains unchanged, i.e., each subgroup is shifted axially as a unit and, on reaching the station P, is ready to be transferred into the holder of a further conveyor, not shown in FIGS. 69 and 70.

A very important advantage of my apparatus is that it may be readily converted for the production of different types of composite mouthpieces for cigarettes or the like. Thus, merely by filling the magazines with filter rods of different materials or of different length, by properly distributing the disk-shaped cutters, by properly adjusting the mechanism which severs the wrapper tape to form wrapper sheets of requisite length, and by proper selection of shifting and spreading cams, I can rapidly convert the apparatus for the production of duplex or triplex mouthpieces, for the production of mouthpieces wherein the adjoining rod-shaped members are in actual abutment with or are spaced from each other, for the production of mouthpieces wherein one component consists of granular filter material, for the production of longer or shorter mouthpieces, or for the production of mouthpieces which consist of as many as four or even more different filters of unit length. This will be readily understood since, by feeding the mouthpieces 127 of FIG. 13 into the magazine 1 of FIG. 1 and by replacing the filter rods 110 of FIG. 1 by filter rods consisting of a third filter material, one can obtain triplex mouthpieces and, by refeeding such triplex mouthpieces into the magazine 1 simultaneously with feeding into the magazine 7 filter rods of a fourth filter material, one will obtain mouthpieces wherein each unit length contains as many as four different filter materials.

Another important advantage of my apparatus is that one type of filter rods, for example, the filter rods 110 of FIG. 1, need not be subdivided into sections of less than double unit length. This is of importance because very short length of filter rod material are hard to handle, especially if the machine is to operate at high speed. Also, and since the diameters of the shifting drums may be selected at will, axial shifting of groups and subgroups with reference to each other may be effected gradually to avoid deformation or other damage to filters and sections.

Figure 66:
Figure 67:
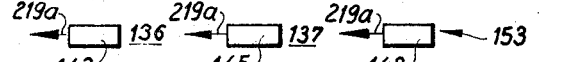
Figure 68:
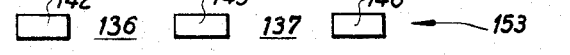

An advantage of the apparatus shown in FIG. 59 is that the subgroup 237 contains rather long sections and that such long sections are subdivided into sections of double unit length only at the time when the apparatus is ready to form the subgroups 153, 154 (FIGS. 66–68). Such comparatively long sections are easier to handle than sections of double unit length.

Without further analysis, the foregoing will so fully reveal the gist of the present invention that others can, by applying current knowledge, readily adapt it for various applications without omitting features which fairly constitute essential characteristics of the generic and specific aspects of this invention and therefore, such adaptations should and are intended to be comprehended within the meaning and range of equivalence of the following claims.

What is claimed as new and desired to be secured by Letters Patent is:

1. A method of producing composite mouthpieces, comprising forming first parallel groups of coaxial rod-shaped members wherein the adjoining members are separated by gaps; subdividing each of a series of parallel filter rods consisting of a material other than the material of said first groups into a second group of rod-shaped members wherein the number of such members is a multiple of the number of gaps between the members of a first group; breaking up each second group into a plurality of subgroups wherein each subgroup contains the same number of axially spaced members as the number of gaps between the members of a first group by moving the members of such subgroups transversely with reference to each other; shifting at least some of said subgroups axially to move each member of any given subgroup in transverse alignment with a member of each other subgroup whereby the subgroups form a single file; shuffling each subgroup with one of said first groups by introducing each member of any given subgroup into one of the gaps between the members of the corresponding first group to form assemblies wherein members of the first groups alternate with members of the subgroups; and convoluting an adhesive-coated wrapper sheet around each of said assemblies to form composite mouthpieces of multiple unit length.

2. A method of producing composite mouthpieces, comprising forming first parallel groups of coaxial rod-shaped members wherein the adjoining members are separated by gaps; subdividing each of a series of parallel filter rods consisting of a material other than the material of said first groups into a second group of rod-shaped members wherein the number of such members is a multiple of the number of gaps between the members of a first group; breaking up each second group into a plurality of subgroups wherein each subgroup contains the same number of axially spaced members as the number of gaps between the members of a first group by moving the members of such subgroups transversely with reference to each other; shifting at least some of said subgroups axially to move each member of any given subgroup in transverse alignment with a member of each other subgroup and with one of said gaps whereby the subgroups form a single file; shuffling each subgroup with one of said first groups by introducing each member of any given subgroup into one of the gaps between the members of the corresponding first group to form assemblies wherein members of the first groups alternate with members of the subgroups; and convoluting an adhesive-coated wrapper sheet around each of said assemblies to form composite mouthpieces of multiple unit length.

3. A method of producing composite mouthpieces, comprising subdividing each of a series of parallel filter rods consisting of a first filter material into a first group of coaxial rod-shaped members; shifting the members of each first group axially and away from each other so that the adjoining members are separated by gaps; subdividing each of a series of parallel filter rods consisting of a second filter material into a second group of rod-shaped members wherein the number of such members is a multiple of the number of gaps between the members of a first group; breaking up each second group into a plurality of subgroups wherein each subgroup contains the same number of axially spaced members as the number of gaps between the members of a first group by moving the members of such subgroups transversely with reference to each other; shifting at least some of the thus obtained subgroups axially to move each member of any subgroup in transverse alignment with a member of each other subgroup whereby the subgroups form a single file; shuffling each subgroup with one of said first groups by introducing each member of any given subgroup into one of the gaps between the members of the corresponding first group to form assemblies wherein members of said first filter material alternate with members of said second filter material; and convoluting an adhesive-coated wrapper sheet around each of said assemblies to form composite mouthpieces of multiple unit length.

4. A method of producing composite mouthpieces for cigarettes or the like, comprising subdividing each of a series of parallel filter rods consisting of a first filter material into a group of coaxial rod-shaped members including two filters of unit length and at least one intermediate section of double unit length; shifting the members of each first group axially and away from each other so that the adjoining members are separated from each other by gaps of at least double unit length; subdividing each of a series of parallel filter rods consisting of a second filter material into a second group of rod-shaped members of double unit length wherein the number of such members is a whole multiple of the number of gaps between the members of a first group; breaking up each second group into a plurality of subgroups wherein each subgroup contains the same number of axially spaced members as the number of gaps between the members of a first group and wherein the adjoining members are separated by gaps of at least double unit length by moving the subgroups transversely with reference to each other; shifting at least some of the thus moved subgroups axially to place each member of any given subgroup in transverse alignment with a member of each other subgroup whereby the subgroups form a single file; shuffling each subgroup with one of said first groups by introducing each member of any given subgroup into one of the gaps between the members of the corresponding first group and by introducing each intermediate section of any given first group into a gap between the members of the corresponding subgroup to form assemblies of coaxial rod-shaped members wherein members of said first filter material alternate with members of said second filter material and wherein the filters of the corresponding first group are disposed at the ends; and convoluting an adhesive-coated wrapper sheet around each of said assemblies to form composite mouthpieces of multiple unit length.

5. A method of producing composite mouthpieces, comprising forming first parallel groups of coaxial rod-shaped members wherein the adjoining members are separated by gaps; subdividing each of a series of parallel filter rods consisting of a material other than the material of said first groups into a second group of rod-shaped members wherein the number of such members is a multiple of the number of gaps between the members of a first group; breaking up each second group into a plurality of subgroups wherein each subgroup contains the same number of axially spaced members as the number of gaps between the members of a first group by moving the members of such subgroups transversely and in different directions with reference to each other; shifting at least some of said subgroups axially to move each member of any given subgroup in transverse alignment with a member of each other subgroup whereby the subgroups form a single file; shuffling each subgroup with one of said first groups by introducing each member of any given subgroup into one of the gaps between the members of the corresponding first group to form assemblies wherein members of the first groups alternate with members of the subgroups; and convoluting an adhesive-coated wrapper sheet around each of said assemblies to form composite mouthpieces of multiple unit length.

6. A method of producing composite mouthpieces, comprising forming first parallel groups of coaxial rod-shaped members wherein the adjoining members are separated by gaps of identical length; subdividing each of a series of parallel filter rods consisting of a material other than the material of said first groups into a second group of rod-shaped members wherein the number of such members is a whole multiple of the number of gaps between the members of a first group and wherein the axial length of a member is less than the length of a gap; breaking up each second group into a plurality of subgroups wherein each subgroup contains the same number of axially spaced members as the number of gaps between the members of a first group by moving such subgroups transversely with reference to each other; shifting at least some of said subgroups axially to move each member of any given subgroup in transverse alignment with a member of each other subgroup and with one of said gaps whereby the subgroups form a single file; shuffling each subgroup with one of said first groups by introducing each member of any given subgroup centrally into one of the gaps between members of the corresponding first group to form assemblies wherein members of the first groups alternate with and are separated by clearances from the members of the subgroups; condensing the assemblies by moving their members axially and in actual abutment with each other to eliminate said clearances; and convoluting an adhesive-coated wrapper sheet around each of the thus condensed assemblies to form composite mouthpieces of multiple unit length.

7. A method of producing composite mouthpieces, comprising forming first parallel groups of coaxial rod-shaped members wherein the adjoining members are separated by gaps of identical length; subdividing each of a series of parallel filter rods consisting of a material other than the material of said first groups into a second group of rod-shaped members wherein the number of such members is a whole multiple of the number of gaps between the members of a first group and wherein the axial length of a member is less than the length of a gap; breaking up each second group into a plurality of subgroups wherein each subgroup contains the same number of axially spaced members as the number of gaps between the members of a first group by moving such subgroups transversely with reference to each other; shifting at least some of said subgroups axially to move each member of any given subgroup in transverse alignment with a member of each other subgroup and with one of said gaps whereby the subgroups form a single file; shuffling each subgroup with one of said first groups by introducing each member of any given subgroup centrally into one of the gaps between members of the corresponding first group to form assemblies wherein members of the first group alternate with and are separated by clearances from the members of the subgroups; introducing a filter of a third material into each of said clearances so that the filters are separated from each other by the rod-shaped members of the respective assemblies; and convoluting an adhesive-coated wrapper sheet around each of said assemblies to form triplex mouthpieces of multiple unit length.

8. A method of producing composite mouthpieces, comprising forming first parallel groups of coaxial rod-shaped members wherein the adjoining members are separated by gaps of identical length; subdividing each of a series of parallel filter rods consisting of a material other than the material of said first groups into a second group of rod-shaped members wherein the number of such members is a whole multiple of the number of gaps between the members of a first group and wherein the axial length of a member is less than the length of a gap; breaking up each second group into a plurality of subgroups wherein each subgroup contains the same number of axially spaced members as the number of gaps between the members of a first group by moving such subgroups transversely with reference to each other; shifting at least some of said subgroups axially to move each member of any given subgroup in transverse alignment with a member of each other subgroup and with one of said gaps whereby the subgroups form a single file; shuffling each subgroup with one of said first groups by introducing each member of any given subgroup centrally into one of the gaps between members of the corresponding first group to form assemblies wherein members of the first groups alternate with and are separated by clearances from the members of the subgroups; connecting each of said assemblies with an adhesive-coated wrapper sheet and partially convoluting such sheets around the respective assemblies so that each of said clearances forms an open-sided pocket; introducing into each of said pockets a measured quantity of granular filter material; and completing the convolution of said sheets around the respective assemblies to close said pockets and to transform each assembly into a triplex mouthpiece of multiple unit length.

9. A method as set forth in claim 8, wherein said granular filter material consists of charcoal.

10. A method of producing composite mouthpieces, comprising forming a file of first parallel equidistant groups of coaxial rod-shaped members consisting of a first filter material and wherein the adjoining members are separated by gaps; subdividing each of a series of parallel filter rods consisting of a filter material other than the material of said first groups into a second group of rod-shaped members wherein the number of members is a whole multiple of the number of gaps between the members of a first group and wherein the axial length of a member at most equals the length of a gap; breaking up each second group into a plurality of subgroups wherein each subgroup contains the same number of axially spaced members as the number of gaps between the members of a first group by moving such subgroups transversely with reference to each other; shifting at least some of said subgroups axially to move each member of any given subgroup in transverse alignment with a member of each other subgroup and with one of said gaps whereby the subgroups form a single file of equidistant subgroups wherein the spacing between a pair of adjoining subgroups equals the spacing between a pair of adjoining first groups; shuffling consecutive subgroups with consecutive first groups by introducing each member of a subgroup into one of the gaps between the members of the corresponding first group to form assemblies wherein members of said first material alternate and are coaxial with members of said second material; and convoluting an adhesive-coated wrapper sheet around each of said assemblies to form composite mouthpieces of multiple unit length.

11. A method of producing composite mouthpieces, comprising forming first parallel groups of coaxial rod-shaped members wherein the adjoining members are separated by gaps; subdividing in a plurality of stages each of a series of parallel filter rods consisting of a material other than the material of said first groups into a second group of rod-shaped members wherein the number of such members is a multiple of the number of gaps between the members of a first group; breaking up each second group into a plurality of subgroups wherein each subgroup contains the same number of axially spaced members as the number of gaps between the members of a first group by moving the members of such subgroups transversely with reference to each other; shifting at least some of said subgroups axially to move each member of any given subgroup in transverse alignment with a member of each other subgroup whereby the subgroups form a single file; shuffling each subgroup with one of said first groups by introducing each member of any given subgroup into one of the gaps between the members of the corresponding first group to form assemblies wherein members of the first groups alternate with members of the subgroups; and convoluting an adhesive-coated wrapper sheet around each of said assemblies to form composite mouthpieces of multiple unit length.

12. A method of producing composite mouthpieces, comprising forming first parallel groups of coaxial rod-shaped members which are separated by gaps of at least double unit length and wherein such members include two end filters of unit length and at least one intermediate section of double unit length, all of said members consisting of a first filter material; subdividing each of a series of filter rods consisting of a second filter material into a second group of rod-shaped members including a first subgroup consisting of first sections of double unit length whose number equals the number of gaps between the members of a first group and second sections of a length which is a whole multiple of the length of a first section and whose number equals the number of sections in a first subgroup, said first sections alternating with said second sections; subdividing the second sections of each second group into sections of double unit length to form a plurality of additional subgroups each of which contains the same number of sections as the number of gaps between the members of a first group and wherein the sections of such additional subgroups alternate with each other; breaking up said second groups by moving the respective first and additional subgroups transversely with reference to each other; shifting at least some of said subgroups axially with reference to each other to form a single file of subgroups wherein each section of any given subgroup is in transverse alignment with a section of each other subgroup and with one of said gaps; shuffling each subgroup with one of said first groups by introducing each section of a subgroup into a gap between the members of the corresponding first group to form assemblies wherein members of different materials alternate with each other; and convoluting an adhesive-coated wrapper sheet around each of said assemblies to form composite mouthpieces of multiple unit length.

13. A method of producing composite mouthpieces, comprising forming first parallel groups of coaxial rod-shaped members consisting of a first filter material and separated by gaps of at least double unit length; subdividing each of a series of filter rods consisting of a material other than the material of said first groups into a second group of coaxial rod-shaped members including more than two subgroups consisting of axially spaced sections of double unit length and wherein the sections of such subgroups alternate with each other; breaking up said second groups by staggering their subgroups transversely and seriatim with reference to each other so that, on movement of a first subgroup wtih reference to the remaining subgroups of the same second group, the sections of the first subgroup are separated from each other by gaps whose length equals the length of several sections; shifting at least some of said subgroups axially to move each section of any given subgroup in transverse alignment with a section of each other subgroup and with a gap between the members of said first groups; shuffling each subgroup with one of said first groups by introducing each section of any given subgroup into one of the gaps between the members of the corresponding first group to form assemblies wherein members of different materials alternate with each other; and convoluting an adhesive-coated wrapper sheet around each of said assemblies to form composite mouthpieces of multiple unit length.

14. A method of producing composite mouthpieces, comprising forming first parallel groups of coaxial rod-shaped members consisting of a first filter material which are separated by gaps of at least double unit length and each of which comprises two end filters of unit length and at least one intermediate section of double unit length; subdividing each of a series of filter rods consisting of a material other than the material of said first groups into a second group of coaxial rod-shaped members including three subgroups of axially spaced sections of double unit length wherein the sections of such subgroups alternate with each other; breaking up said second groups by moving a first subgroup transversely with reference to the remaining subgroups of the same second group, by thereupon shifting the remaining subgroups axially so that the sections of the second subgroup are in transverse alignment with the sections of the first subgroup, by thereupon moving the sections of the third subgroup transversely with reference to the sections of the second group, and by shifting the third subgroup axially to move its sections in transverse alignment with the sections of said first and second subgroups whereby such subgroups form a single file; shuffling each subgroup with one of said first groups by introducing the sections of the subgroups into the gaps between the members of the corresponding first group to form assemblies wherein rod-shaped members of different materials alternate with each other; and convoluting an adhesive-coated wrapper sheet around each of said assemblies to form composite mouthpieces of multiple unit length.

15. In a method of producing composite mouthpieces, the steps of subdividing an elongated filter rod of multiple unit length into at least two subgroups of rod-shaped sections of double unit length wherein the sections of one subgroup alternate with the sections of the other subgroup; staggering the two subgroups transversely with reference to each other; and shifting one of the subgroups axially with reference to the other subgroup so that each section of one subgroup is moved in transverse alignment with a section of the other subgroup.

16. In a method of producing composite mouthpieces, the steps of subdividing an elongated filter rod of multiple unit length into a first subgroup of rod-shaped sections of double unit length and a second subgroup of rod-shaped sections whose length is a whole multiple of the length of a section in the first subgroup and whose sections alternate with the sections of the first subgroup; staggering the two subgroups transversely with reference to each other; shifting one of the subgroups axially with reference to the other subgroup so that the sections of the first subgroup are in transverse alignment with portions of the sections of the second subgroup; subdividing each section of the second subgroup into at least two sections of double unit length so that said second subgroup yields two additional subgroups whose sections alternate with each other and wherein the sections of one additional subgroup are in transverse alignment with the sections of the first subgroup; staggering the two additional subgroups transversely with reference to each other; and shifting the other additional subgroup axially with reference to said one additional subgroup so that each section of the other additional subgroup is moved in transverse alignment with one section of said first subgroup whereby said first subgroup and said addtiional subgroups form a single file.

17. In a method of producing composite mouthpieces, the steps of subdividing an elongated filter rod of multiple unit length into three subgroups of rod-shaped sections of double unit length wherein the adjoining sections of each subgroup are separated from each other by one section of each other group staggering the subgroups transversely with reference to each so that the sections of each subgroup are separated by gaps; and shifting two of said subgroups in transverse alignment with the third subgroup so that such subgroups form a single file wherein each section of any given subgroup is in transverse alignment with one section of each other subgroup and wherein the sections of each subgroup remain separated by gaps.

18. In a method of producing composite mouthpieces, the steps of moving a series of equidistant parallel filter rods of multiple unit length in an elongated path and in a direction substantially at right angles to the axes thereof, subdividing each consecutive filter rod into at least two subgroups of coaxial rod-shaped sections of double unit length wherein the sections of one subgroup alternate with the sections of the other subgroup; staggering the subgroups of consecutive filter rods transversely with reference to each other by moving such subgroups in different paths; and shifting one subgroup of each filter rod axially with reference to the other subgroup so that each section of one subgroup is moved in transverse alignment with a section of the other subgroup whereby such subgroups form a single file; and continuously advancing said subgroups in a direction substantially at right angles to the axes thereof.

19. In a method as set forth in claim 18, wherein said filter rods and said subgroups are advanced in a series of arcuate paths.

20. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being at most equal to said predetermined length and the number of members in each subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup.

21. An apparatus for producing composite mouthpieces, comprising first conveyor means for advancing sideways a file of parallel filter rods consisting of a first filter material; cutter means cooperating with said first conveyor means for subdividing the filter rods into first groups each of which consists of a plurality of coaxial rod-shaped members; shifting means for moving the members of each consecutive first group axially and away from each other to form between such members gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being at most equal to said predetermined length and the number of members in each subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup.

22. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being at most equal to said predetermined length and the number of members in each subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of parallel filter rods consisting of a second filter material, cutter means cooperating with said third conveyor means for subdividing said filter rods into second parallel groups of rod-shaped members each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup.

23. An apparatus as set forth in claim 22, wherein each of said second groups comprises more than two subgroups and wherein the filter rods of said second material are subdivided in a plurality of stages, said cutter means comprising a plurality of cutters disposed in a plurality of rows to effect such stagewise subdivision of said last named filter rods.

24. An apparatus as set forth in claim 22, wherein said conveyor means comprise equidistant holders for the respective groups and subgroups and wherein the means for moving the subgroups of each second group transversely with reference to each other is arranged to stagger such subgroups through distances corresponding to the distance between the first groups.

25. An apparatus as set forthin claim 22, wherein the length of said gaps exceeds the length of a rod-shaped member in any one of said subgroups so that, when said first groups are shuffled with the corresponding subgroups, the adjoining rod-shaped members of said assemblies are separated from each other by clearances of identical length.

26. An apparatus as set forth in claim 25, further comprising condensing means adjacent to said one conveyor means for shifting the members of said assemblies axially and toward each other to eliminate said clearances so that the thus shifted members are in actual abutment with each other prior to the application of wrapper sheets.

27. An apparatus as set forth in claim 25, further comprising filling means for introducing into each of said clearances a measured quantity of comminuted filter material.

28. An apparatus as set forth in claim 21, wherein said wrapping means comprises means for deforming each of said sheets into a substantially U-shaped body whereby each of said clearances forms an open-sided pocket and for thereupon completing the convolution of such U-shaped bodies around the respective assemblies to close said pockets, said filling means being positioned adjacent to said wrapping means to admit granular filter material through the open sides of said pockets prior to complete convolution of said U-shaped bodies.

29. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being the same as the number of gaps between the members of a first group, said first and second conveyor means defining between themselves a plurality of transfer stations at which alternate first groups are shuffled with said subgroups to form assemblies of coaxial members which are thereupon advanced by said first conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup.

30. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material, said second conveyor means comprising a plurality of conveyors and each of said conveyor means comprising a plurality of equidistant holders for the respective rod-shaped members, the distance between the holders of some conveyors of said second conveyor means being a multiple of the distance between the holders of said first conveyor means; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup.

31. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being at most equal to said predetermined length and the number of members in each subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup, said last named means comprising a rotary drum including a hollow cylindrical mantle having a plurality of radially extending slots, a holder provided along the periphery of said mantle adjacent to each of said slots, each of said holders being arranged to accommodate a subgroup, followers connected with said holders and extending through the corresponding slots, and a fixed cam provided in said mantle and having a portion which is tracked by said followers, the configuration of said portion being such that said followers and said holders move in the axial direction of said mantle to thereby shift the corresponding subgroups in response to rotation of said drum with reference to said cam.

32. An apparatus for producing composite mouthpieces, comprising first conveyor means for advancing sideways a file of first parallel groups consisting of a first filter material and each including a plurality of rod-shaped members spaced from each other by gaps of predetermined length; second conveyor means for advancing sideways a file of parallel subgroups consisting of a second filter material and each including coaxial rod-shaped members spaced from each other by gaps of a length which at least equals that of the longest member of a first group, the axial length of any given member of a subgroup being at most equal to said predetermined length and the number of members in each subgroup being the same as the number of gaps between the members of a first group, said first and second conveyor means defining between themselves at least one transfer station at which said first groups are shuffled with consecutive subgroups to form assemblies of coaxial members which are thereupon advanced by one of said conveyor means and wherein members of said first material alternate with members of said second material; means for convoluting adhesive-coated wrapper sheets around said assemblies to form composite mouthpieces of multiple unit length; and means for feeding said subgroups to said second conveyor means, comprising third conveyor means for advancing sideways a file of second parallel groups each of which consists of at least two subgroups and wherein the members of such subgroups alternate with each other, means for moving the subgroups of each second group transversely with reference to each other, and means for shifting at least some subgroups axially with reference to the remaining subgroups so that each member of any given subgroup is moved in transverse alignment with a member of each other subgroup whereby such subgroups form a single file which is transferred onto said second conveyor means for shuffling with said first groups, each member of each subgroup being in registry with one of said gaps.

References Cited
UNITED STATES PATENTS

| | | | |
|---|---|---|---|
| 2,882,970 | 4/1959 | Schur | 93—1 |
| 3,039,367 | 6/1962 | Stelzer | 93—1 |
| 3,081,778 | 3/1963 | Dearsley | 93—1 XR |
| 3,164,242 | 1/1965 | Schubert et al. | 93—1 XR |
| 3,164,243 | 1/1965 | Rudszinat et al. | |
| 3,259,029 | 7/1966 | Hall et al. | 93—1 |

BERNARD STICKNEY, *Primary Examiner.*